United States Patent [19]

Groshens et al.

[11] Patent Number: 5,061,546

[45] Date of Patent: Oct. 29, 1991

[54] THERMO-ADHESIVE TEXTILE MATERIAL COMPRISING A CHEMICALLY BLOCKED CROSS LINKING AGENT

[75] Inventors: Pierre Groshens, Peronne; Christian Paire, Roisel, both of France

[73] Assignee: Lainiere de Picardie, Societe Anonyme, Peronne, France

[21] Appl. No.: 549,645

[22] Filed: Jul. 6, 1990

Related U.S. Application Data

[63] Continuation of Ser. No. 294,187, Jan. 6, 1989, abandoned.

[30] Foreign Application Priority Data

Jan. 8, 1988 [FR] France ............................... 88 00142

[51] Int. Cl.$^5$ .................... A41D 27/00; A41D 27/06; B32B 3/10; B32B 7/14
[52] U.S. Cl. ......................................... 428/196; 2/97; 2/272; 428/198; 428/200; 428/349; 428/355; 428/913
[58] Field of Search .............. 428/200, 349, 196, 198, 428/355, 913; 2/97, 272

[56] References Cited

U.S. PATENT DOCUMENTS

| | | |
|---|---|---|
| 3,922,418 | 11/1975 | Lauchenauer ..................... 428/349 |
| 3,937,859 | 2/1976 | Carra et al. ....................... 428/198 |
| 4,076,881 | 2/1978 | Sato ................................... 428/196 |
| 4,438,533 | 3/1984 | Hefele ................................ 428/198 |
| 4,486,902 | 12/1984 | Sakai ...................................... 2/97 |
| 4,874,655 | 10/1989 | Groshens . | |

FOREIGN PATENT DOCUMENTS 126978 5/1988 Japan .

Primary Examiner—James C. Cannon
Attorney, Agent, or Firm—Mason, Fenwick & Lawrence

[57] ABSTRACT

A thermo-adhesive textile product comprising a backing fabric and an adhesive layer deposited on its surface with the adhesive layer comprising a thermo-adhesive polymer and a cross linking agent which is activated when it is heated above a given temperature.

16 Claims, No Drawings

THERMO-ADHESIVE TEXTILE MATERIAL COMPRISING A CHEMICALLY BLOCKED CROSS LINKING AGENT

This application is a continuation of application Ser. No. 294,187, filed Jan. 6, 1989, now abandoned.

The invention concerns thermo-adhesive materials usable in the textile industry. They consist of a backing fabric covered with thermo-adhesive polymers.

It more particularly concerns the reinforcing materials intended to be glued to the back of any cloth to improve its strength or increase its stiffness, on fusible interlining fabrics.

The backing fabric of the thermo-adhesive materials can be of various types, woven, knitted or non-woven. The properties required for the reinforcing cloth are determined by the various stages of their manufacture and use.

Once the backing fabric has been made it is covered with the thermo-adhesive product. At present this application is usually dot patterns application done with an engraving cylinder. The thermo-adhesive polymers which are initially in the form of powder or paste are raised to a temperature of about 80° C. to make them melt and stick to the backing. In another method the application is carried out by transfer. In this case the thermo-adhesive powder is deposited in the form of dots on a mat which has been treated to make it non-adhesive. These dots are then transferred to the backing fabric at a lower temperature.

The textile thermo-adhesive product obtained during the first stage is then stored at ambient temperature. The various layers of the product should not stick to each other. This means that the product should not be tacky. In other words, once it has returned to ambient temperature the textile product should not be adhesive.

The thermo-adhesive textile product is then used by makers who apply it to the garment and glue the reinforcing material to the cloth using presses operating at temperatures between 120° C. and 180° C. and pressures between a few decibars and a few bars for relatively shorts periods of 10 to 30 seconds. During this stage the polymers of the textile product should once again become adhesive. However they should not have too low a viscosity during this operation otherwise the polymers will go through the backing fabric or the cloth itself causing marks which make the products obtained useless.

Finally, the finished clothes and cloths with reinforcing material should be able to withstand various methods of use and washing. The gluing carried out in the previous stage should be able to stand up to very difficult ambient conditions.

Many attempts have been made to develop products which satisfy the various demands resulting from all the stages mentioned above.

Pursuant upon this one suggestion was to make an adhesive consisting of two or more layers of polymers with different physical characteristics. By carefully choosing the viscosity and the fusion temperature of these various layers it is possible to limit the soaking through and back. However, this technique has been found to be extremely difficult to execute.

The method of depositing the thermo-adhesive material on the textile substrate by what is called "tranfer" makes it possible to avoid excessive penetration of the adhesive material into the textile substrate.

It has also been suggested that a thermo-adhesive product should be deposited on the textile substrate and that it should be made thermo-setting by the action of a cross linking agent put into contact with it later.

Consequently the purpose of this invention is to produce a thermo-adhesive textile product, which can be used as reinforcing cloth and which can be glued on without soaking through or back, and stands up to use, and especially to products used for cleaning clothes.

The heat sealant product which is the subject of this invention is of the type comprising a backing fabric and an adhesive layer consisting of a thermo-adhesive layer and a cross linking agent. It is characterized in that the cross linking agent can be activated by the effect of heat.

The invention will be better understood after reading the following description and studying the examples given.

The invention is based on the use of the properties of certain polymers and on the establishment of a composition of thermo-adhesive and thermo-setting polymers with remarkable properties as adhesive layers for a thermo-adhesive product.

Many thermo-plastic and thermo-setting polymers are known. When these polymers are raised to a critical temperature they pass from a solid to a liquid state. As long as the temperature does not rise too high, the viscosity change is generally reversible. In the same way, when raised to a certain temperature, they become adhesive and lose this property when the temperature falls.

By cross linking, a thermo-adhesive thermo-plastic can become thermo-setting. In other words, after cross linking, it can no longer change from the solid to liquid states with a rise in temperature.

Surprisingly, according to the invention, it has been shown that a thermo-adhesive product can be created by using an adhesive layer comprising a thermo-setting polymer and a cross linking agent which is activated when its temperature is raised above a certain level.

In this way, when temperature is under this level, the adhesive can be subjected to a certain number of transformations, for example to enable it to adhere to a garment or a cloth. Its change of state by cross linking with consequent final adherence is then obtained by exceeding this temperature.

During this change two phenomena take place simultaneously, on the one hand the liquification of the adhesive as a thermo-plastic and on the other its cross linking and consequent change into a thermo-setting product.

These two phenomena have opposite effects on the viscosity of the adhesive layer. Starting from the normal ambient temperature, the change in the thermo-plastic dominates first tending to reduce the viscosity of the layer, but later after the critical temperature of the cross linking agent has been exceeded the cross linking becomes dominant and the viscosity of the adhesive layer is increased.

According to the invention, a single homogenous adhesive layer combines all these properties. It has been shown that by a suitable choice of the various natures and properties of the components of this layer, it is possible to obtain a layer which as its temperature rises before changing state passes through a phase where it is sufficiently liquid to ensure good adhesion of the thermo-adhesive product, for example on a piece of garment or cloth, while maintaining sufficient viscosity to avoid the danger of soaking through the cloth or its own backing.

These properties are controlled more easily if a catalyst, whose concentration enables the speed of the cross linking reaction to be altered, is added to the adhesive layer. The cross linking agent is blocked chemically, that is, below a certain temperature it remains chemically inactive in relation to free functional chains of the polymeric chain of the thermo-adhesive polymer. Several types of blockage of this cross linking agent can be used.

The cross linking agent can be blocked by a blocking agent. For example isocyanates are blocked by caprolactams, oximes, phenols or imidazolines. The release temperature is then specific to the combination of cross linking and blocking agent.

The cross linking agent can be blocked by a preliminary reaction on itself in the form of dimer or trimer. Temperature rise then produces disassociation of the cycles into unitary cross linking agents. Isocyanate uretodiones and polyuretonimines are in this category.

One can also use cross linking agents which include one or more cyclic compounds capable of opening under the effect of temperature. This is the case of oxazolines and imidazolines.

One can also use cross liking agents with one or more functional groups whose functional structures will be modified by the effect of temperature. In some cases the presence of a catalyst will then be necessary. Acyl azides are in this category. By a rearrangement by the reaction called the Curtius Reaction a carbonyl azide is formed which is immediately changed into a reactive free isocyanate or reactive nitrene.

Many thermo-hardening polymers can be used to form the adhesive layer. We could mention mainly copolyamides, copolyesters, copolyethylenes, ethylenes, vinyl acetate, vinyl chloride and polyurethanes.

Many backing fabrics can be used to receive the adhesive layer according to the invention. In the case of a thermo-adhesive product intended for making reinforcing or tripling cloth for the textile industry, these carrier materials can be either knitted, woven or made from non-woven material.

The adhesive layer may be spread on the carrier material by traditional methods, by an engraving cylinder for example. The adhesive layer is now usually made up of a system of dot patterns.

The adhesive can also be applied by transfer. In this case the adhesive is first deposited by a cylinder onto a mat which has ben treated to be non-adhesive. Its temperature is then lowered for it to be transferred from the mat to the backing fabric itself.

According to a preferred method for producing a thermo-adhesive product to make up a tripling cloth, the adhesive layer comprises:

59.5 parts of a solution of 1.4% ammonium polyacrylate, 4 parts of stearic acid, 30 parts of polyamide with a melting point of 90° C., 6 parts of polyuretonimine with a release temperature of 110° C., 0.5 parts of an accelerator such as that sold by the Rayer company under the name "DESMORAPIDE".

After spreading by a seriography process drying is done in an oven whose temperature is set regulated to 90° C. The weight/area is about 13 g/m$^2$.

After drying this layer is stable. The gluing of the thermo-adhesive material on the cloth is carried out by the tailor on a thermo-adhesive press at temperatures of 130° C. to 150° C.

We claim:

1. An elevated temperature textile fabric bonding process-usable thermo-adhesive product, comprising a backing fabric with an adhesive layer deposited as dots on its surface, said adhesive layer comprising a thermoplastic polymer and a cross-linking agent, said cross-linking agent being chemically blocked at ambient temperatures but activatable to the polymer-reactive state at the elevated temperature conditions of the textile fabric bonding process.

2. Thermo-adhesive product according to claim 1, wherein said cross-linking agent is activated to said polymer-reactive state at temperatures between 80° C. and 130° C.

3. Thermo-adhesive product according to claim 1, wherein said adhesive layer further comprises a catalyst whose concentration alters the speed of the reaction produced when said cross linking agent is activated.

4. Thermo-adhesive product according to claim 1, wherein a temperature of about 130° C. causes the adhesive layer to pass through an adhesive state and to then harden by cross linking.

5. Thermo-adhesive product according to claim 1, wherein the cross linking agent is blocked by a blocking agent.

6. Thermo-adhesive product according to claim 5, wherein said cross linking agent comprises at least one isocyanate.

7. Thermo-adhesive product according to claim 6, wherein said blocking agent comprises caprolactam.

8. Thermo-adhesive product according to claim 6, wherein said blocking agent comprises oxine.

9. Thermo-adhesive product according to claim 1, wherein said cross linking agent is a polymer which disassociates under the effect of temperature.

10. Thermo-adhesive product according to claim 7, wherein said cross linking agent is a polymer comprising isocyanate groups associated with uretodione groups.

11. Thermo-adhesive product according to claim 1, wherein said cross linking agent comprises one or more cyclic compounds capable of opening under the effect of temperature.

12. Thermo-adhesive product according to claim 1, wherein said cross linking agent comprises an oxazoline group.

13. Thermo-adhesive product according to claim 1, wherein said cross linking agent is heat sensitive and comprises at least one function capable of being modified by heat into a new function which makes the thermo-plastic polymer thermosetting.

14. Thermo-adhesive product according to claim 13, wherein said cross linking agent comprises an acyl azide.

15. Thermo-adhesive product according to claim 1, wherein said thermo-plastic polymer is selected from the group consisting of polyamides and copolyamides.

16. Thermo-adhesive product according to claim 1, wherein said thermo-plastic polymer is selected from the group comprised of polyesters and copolyesters.

* * * * *